US008639570B2

(12) United States Patent
Li et al.

(10) Patent No.: US 8,639,570 B2
(45) Date of Patent: Jan. 28, 2014

(54) USER ADVERTISEMENT CLICK BEHAVIOR MODELING

(75) Inventors: Hua Li, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 12/131,126

(22) Filed: Jun. 2, 2008

(65) Prior Publication Data

US 2009/0299967 A1    Dec. 3, 2009

(51) Int. Cl.
*G06F 17/30* (2006.01)
*G06Q 30/00* (2012.01)
*G06F 7/00* (2006.01)

(52) U.S. Cl.
USPC .............. 705/14.26; 705/14.47; 707/690; 707/688

(58) Field of Classification Search
USPC .................. 707/723–738, 769–771
See application file for complete search history.

(56) References Cited

U.S. PATENT DOCUMENTS

| | | | | |
|---|---|---|---|---|
| 6,714,975 B1 * | 3/2004 | Aggarwal et al. | ............. | 709/224 |
| 6,836,773 B2 | 12/2004 | Tamayo et al. | | |
| 7,523,016 B1 * | 4/2009 | Surdulescu et al. | .......... | 702/185 |
| 7,657,626 B1 * | 2/2010 | Zwicky | .......... | 709/224 |
| 7,844,590 B1 * | 11/2010 | Zwicky et al. | ................ | 707/706 |
| 2003/0023715 A1 * | 1/2003 | Reiner et al. | .................. | 709/224 |
| 2005/0144064 A1 * | 6/2005 | Calabria et al. | ................ | 705/14 |
| 2006/0004594 A1 * | 1/2006 | Doliov | ............................... | 705/1 |
| 2006/0136294 A1 | 6/2006 | Linden et al. | | |
| 2006/0200555 A1 | 9/2006 | Shannon et al. | | |
| 2006/0265493 A1 * | 11/2006 | Brindley et al. | .............. | 709/224 |
| 2007/0033106 A1 | 2/2007 | Mason | | |
| 2007/0061211 A1 * | 3/2007 | Ramer et al. | .................... | 705/25 |
| 2007/0073579 A1 | 3/2007 | Immorlica et al. | | |
| 2007/0094265 A1 * | 4/2007 | Korkus | ............................. | 707/9 |
| 2007/0129999 A1 * | 6/2007 | Zhou et al. | ...................... | 705/14 |
| 2007/0255821 A1 * | 11/2007 | Ge et al. | ........................ | 709/224 |
| 2008/0004937 A1 | 1/2008 | Chow et al. | | |
| 2008/0109553 A1 * | 5/2008 | Fowler | .......................... | 709/229 |
| 2008/0162227 A1 * | 7/2008 | Jakobsson et al. | ................ | 705/7 |
| 2008/0319842 A1 * | 12/2008 | O'Sullivan et al. | ............ | 705/14 |
| 2009/0157417 A1 * | 6/2009 | Bradley et al. | .................... | 705/1 |
| 2009/0164269 A1 * | 6/2009 | Gupta et al. | ........................ | 705/7 |

OTHER PUBLICATIONS

Ahmed Metwally, Divyakant Agrawal, Amr Abbadi, Qi Zheng "Hide and Seek: Detecting Hit Inflation Fraud in Streams of Web Advertising Networks", 2006 www.cs.ucsb.edu/research/tech_reports/reports/2006-06.pdf.*

Ahmed Metwally, Divyakant Agrawa,l Amr El Abbadi "DETECTIVES: DETEcting Coalition hiT Inflation attacks in adVertising nEtworks Streams" May 2007, ACM.*

"Data Shaping Solutions", http://www.datashaping.com/ppc7.shtml.

(Continued)

*Primary Examiner* — Polina Peach
(74) *Attorney, Agent, or Firm* — L. Alan Collins; Collins & Collins Intellectual, LLC

(57) ABSTRACT

Described herein is technology for, among other things, mining similar user clusters based on user advertisement click behaviors. The technology involves methods and systems for mining similar user clusters based on log data available on an online advertising platform. By building a user linkage representation based on one or more attributes from the log data, the similar user clusters can be harvested in more efficient manner.

15 Claims, 8 Drawing Sheets

300

| RGUID 304 | QUERY 306 | SEARCH IP 308 | SEARCH TIME 310 | SEARCH GUID 312 | CLICK IP 314 | CLICK TIME 316 | CLICK GUID 318 |
|---|---|---|---|---|---|---|---|
| XX121 | 'AUCTION' | 123.345.6.789 | 08:09:10:16 | YY121 | 345.678.9.012 | 08:09:10:18 | ZZ121 |
| XX122 | 'IPOD' | 234.567.8.910 | 08:09:10:17 | YY122 | 456.789.0.123 | 08:09:10:18 | ZZ122 |
| ⋮ | ⋮ | ⋮ | ⋮ | ⋮ | ⋮ | ⋮ | ⋮ |

LOG DATA 302

(56) References Cited

OTHER PUBLICATIONS

Metwally, et al., "Detectives: detecting coalition hit inflation attacks in advertising networks streams", Proceedings of the 16th international conference on World Wide Web, Banff, Alberta, Canada, SESSION: E-commerce and e-content, May 8-12, 2007, pp. 241-250.

Metwally, et al., "Duplicate Detection in Click Streams", Proceedings of the 14th international conference on World Wide Web, Chiba, Japan, SESSION: Usage analysis, May 10-14, 2005, pp. 12-21.

Anupam, et al., "On the Security of Pay-Per-Click and Other Web Advertising Schemes", Proceedings of the eighth international conference on World Wide Web, Toronto, Canada, Year of Publication: 1999, pp. 1-13.

* cited by examiner

| RGUID 304 | QUERY 306 | SEARCH IP 308 | SEARCH TIME 310 | SEARCH GUID 312 | CLICK IP 314 | CLICK TIME 316 | CLICK GUID 318 |
|---|---|---|---|---|---|---|---|
| XX121 | 'AUCTION' | 123.345.6.789 | 08:09:10:16 | YY121 | 345.678.9.012 | 08:09:10:18 | ZZ121 |
| XX122 | 'IPOD' | 234.567.8.910 | 08:09:10:17 | YY122 | 456.789.0.123 | 08:09:10:18 | ZZ122 |
| ... | ... | ... | ... | ... | ... | ... | ... |

LOG DATA 302

| | SEARCH IP 1 | SEARCH IP 2 | ... | SEARCH IP M | SEARCH IP M+1 | ... |
|---|---|---|---|---|---|---|
| CLICK IP 1 | 1 | 0 | | | | |
| CLICK IP 2 | 2 | 2 | | | | |
| CLICK IP 3 | 0 | 1 | | | | |
| CLICK IP 4 | 0 | 1 | | | | |
| CLICK IP 5 | 0 | 1 | | | | |
| ... | ... | ... | | | | |
| CLICK IP N | | | | 1 | 0 | |
| CLICK IP N+1 | | | | 2 | 2 | |
| CLICK IP N+2 | | | | 0 | 1 | |
| CLICK IP N+3 | | | | 0 | 1 | |
| CLICK IP N+4 | | | | 0 | 1 | |
| ... | | | | | | |

USER CLUSTER 1 (columns: SEARCH IP 1, SEARCH IP 2)
USER CLUSTER K (columns: SEARCH IP M, SEARCH IP M+1)

USER ADVERTISEMENT CLICK BEHAVIOR MODELING

BACKGROUND

Pay per click advertising is an arrangement where a web publisher displays a clickable advertisement in exchange for a charge per click paid by the advertiser. An advertising network acts as a middleman between the advertiser and the publisher. The advertising network, such as Microsoft adCenter®, may perform dual roles as the advertising network as well as the publisher. One commonly experienced problem with pay per click advertising relates to click fraud. Click fraud is the practice of artificially inflating traffic statistics to defraud the advertiser or the publisher. By using an automated clicking program or employing low-cost workers to click the link to a target advertisement, perpetrators of the click fraud scheme create an illusion that a large number of potential customers are clicking a link to the target advertisement when, in fact, there is no likelihood that any of the clicks will lead to profit for the advertiser. A sizable portion of advertising budget is lost due to click fraud.

Therefore, the advertiser, publisher and advertising network have worked to develop a better way of detecting click fraud. Owing to their efforts, abnormally high number of clicks coming from one or a small group of computers can be easily detected. This eliminates small scale click fraud activities. However, a large scale click fraud operation is often based on a script which simulates a human clicking from diverse geographic locations. In order to stop this type of click fraud, users' data for clicked advertisements are often necessary in analyzing the users' web activities to detect the presence of click fraud. However, the scope of the users' data available to the publisher may not be enough to identify patterns that span several advertisers. This is due, in part, to the fact that the publisher, unlike the advertising network, often deals with a small number of advertisers. Even with a larger set of user data available in the advertising network, a conventional analysis of the user data may not be enough to detect the click fraud operation since the user data is often based on a script which is intentionally designed to simulate real human clicking behaviors. Unfortunately, click fraud remains a serious problem facing online advertisers.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Described herein is technology for, among other things, mining similar user clusters based on user click behaviors. The associated methods and systems disclosed herein may be implemented via software.

The technology involves determining fraudulent click behavior by analyzing similar user clusters based on search and click patterns of users when accessing web-based advertisements. The search and click patterns may be observed by analyzing log data available on an online advertising platform. The online advertising platform carries a large number of web-based advertisements, so the log data tends to be large enough to identify patterns that span several advertisers. Once one or more attributes from the log data are selected for the analysis, a user linkage representation is generated. By applying a graph search algorithm or a co-clustering algorithm to the user linkage representation, the similar user clusters can be identified. The similar user clusters may share an identical relational pattern in regard to the attribute(s) in the user linkage representation, and that may indicate that user devices in the similar user clusters may be operated according to a script which simulates real human clicking behaviors.

The technology is ideal for an online advertising platform in dealing with click frauds being committed on the web. This is because the online advertising platform has a ready access to log data associated with advertisements it is carrying. The technology which allows the online advertising platform to mine and analyze the similar user clusters makes it possible to locate and determine suspicious activities associated with pay per click in a more efficient manner.

BRIEF DESCRIPTION OF THE DRAWINGS

The accompanying drawings, which are incorporated in and form a part of this specification, illustrate embodiments and, together with the description, serve to explain their principles:

FIG. 3 is a table view of an exemplary log data, according to one embodiment.

FIG. 5A is an exemplary search IP X click IP matrix for illustrating a user linkage representation, according to one embodiment.

Figure 1:
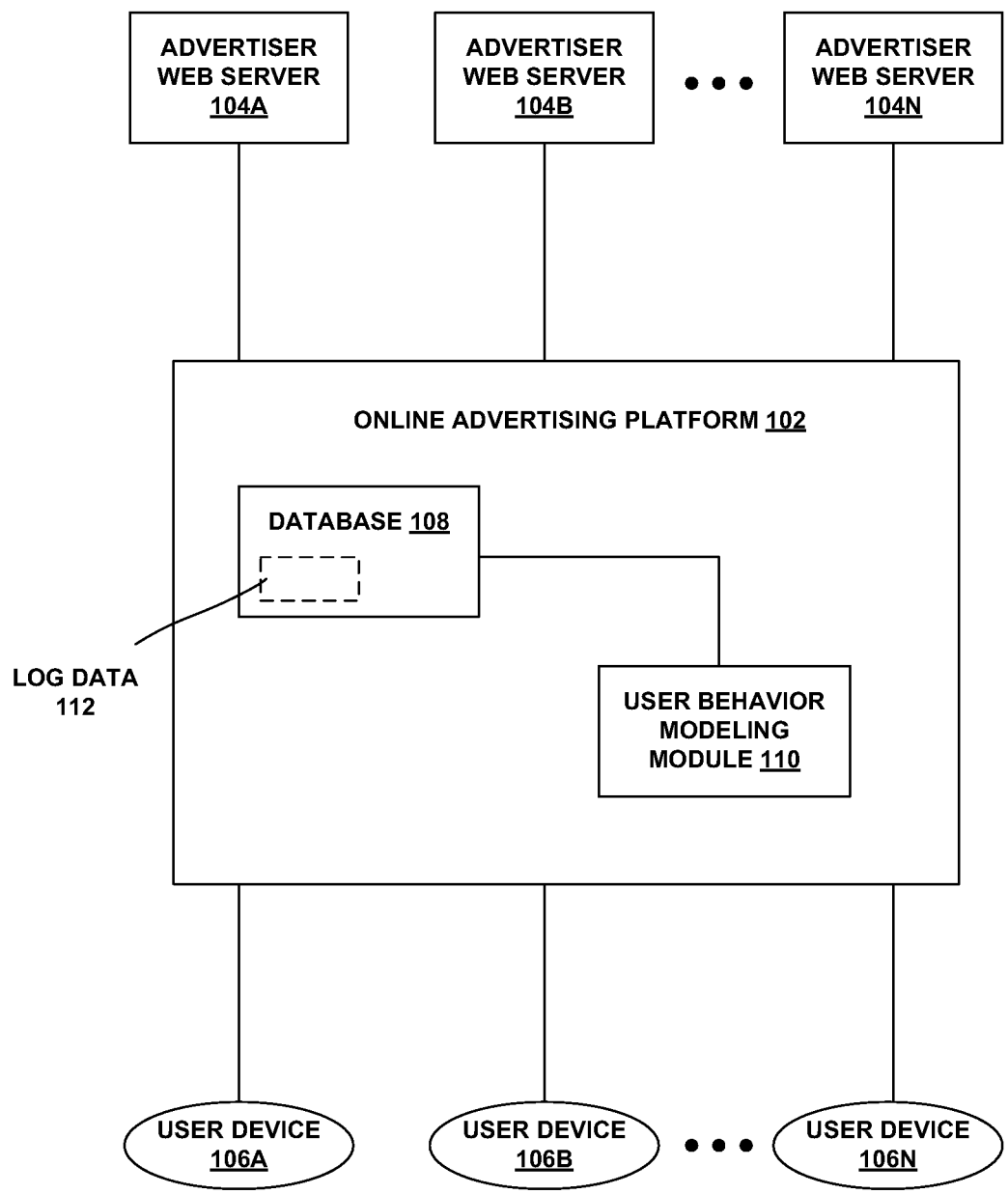
FIG. 1 is a block diagram of an exemplary online advertising platform for implementing embodiments.

Other features of the present embodiments will be apparent from the accompanying drawings and from the detailed description that follows.

DETAILED DESCRIPTION

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining," "outputting, "transmitting," "recording,""locating," "storing," "displaying," "receiving," "recognizing," "utilizing,""generating," "providing," "accessing," "checking," "notifying," "delivering," or the like, refer to the actions and processes of a computer system, or similar electronic computing devices, that manipulate and transform data. The data is represented as physical (electronic) quantities within the computer system's registers and memories and is transformed into other data similarly represented as physical quantities within the computer system memories or registers or other such information storage, transmission, or display devices.

Described herein is technology for, among other things, mining similar user clusters based on user click behaviors. The technology involves analyzing similar user clusters based on search and click patterns of users when accessing web-based advertisements. The search and click patterns may be observed by analyzing log data available on an online advertising platform. Once one or more attributes from the log data are selected for the analysis, a user linkage representation is generated. By applying a graph search algorithm or a co-clustering algorithm to the user linkage representation, the similar user clusters can be identified. The similar user clusters may share an identical relational pattern in regard to the attribute(s) in the user linkage representation, and that may indicate that user devices in the similar user clusters may be operated according to a script which simulates real human clicking behaviors.

FIG. 1 is a block diagram of an exemplary online advertising platform 102 for implementing embodiments. As illustrated in FIG. 1, the online advertising platform 102 is connected to a number of advertiser web servers (e.g., 104A, 104B . . . 104N) and to multiple user devices (e.g., 106A, 106B . . . 106N). It is appreciated that the online advertising platform 102 can perform dual role as an advertisement network as well as a publisher. The online advertising platform server 102 comprises a database 108 for storing log data 112 based on search events and click events performed by the user devices (e.g., 106A, 106B . . . 106N) connected to the online advertising platform 102. The online advertising platform 102 further comprises a user behavior modeling module 110 to build a user linkage representation based on one or more attributes of the log data 112.

Figure 4:
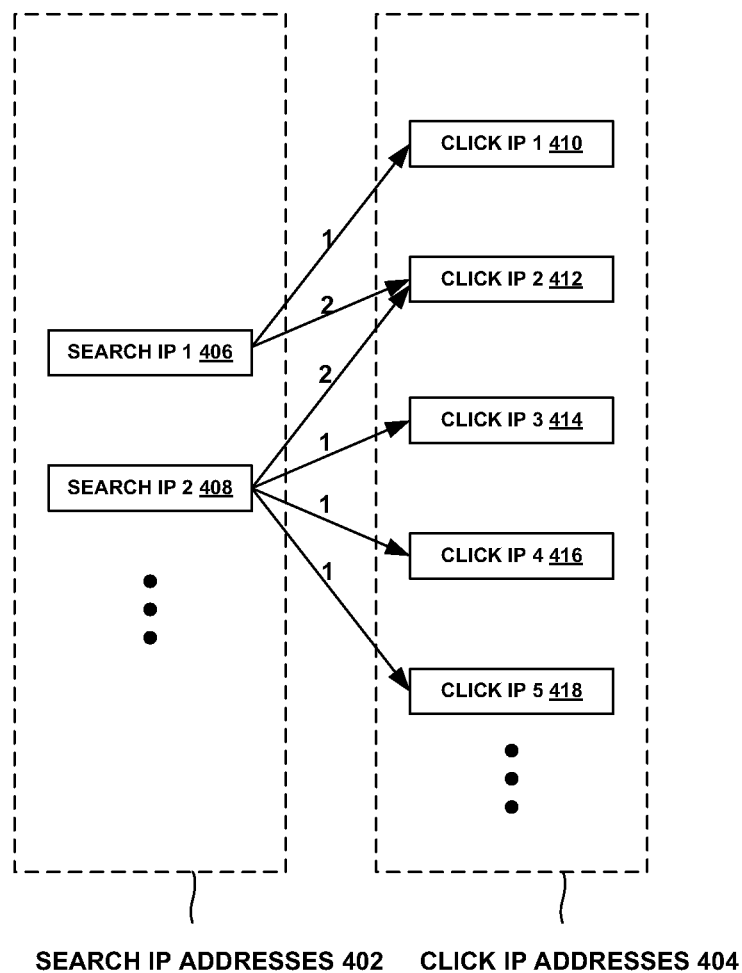
FIG. 4 is a block diagram illustrating IP switching behaviors between search IPs and Click IPs, according to one embodiment.

The user linkage representation is a relational representation which presents the relationship among the attributes, as will be illustrated in more detail in FIG. 4. The user linkage representation is further used to mine similar user clusters among the user devices by applying a co-clustering algorithm or a graph search algorithm to the user linkage representation. It is appreciated that the co-clustering algorithm is a well-known data mining technique which allows simultaneous clustering of the rows and columns of a matrix, as will be illustrated in more detail in FIG. 5A. It is also appreciated that the graph search algorithm is a well-known algorithm for traversing or searching nodes in a graph, such as a user linkage graph as will be illustrated in more detail in FIG. 5B. The user behavior modeling module 110 may then identify respective ones of the user devices associated with the similar user clusters ad candidate devices for committing click fraud.

Each one of the user devices can be identified by a search IP address and/or a click IP address. It is appreciated that a single user device, such as a computer, can have multiple search IP addresses and multiple click IP addresses. Accordingly, the search IP address is used to identify a user device when a query for searching is generated by the user device, whereas the click IP address is used to identify the same user device when an advertisement linkage included in a search result is clicked by the user. The log data 112 comprises search log data and click log data. The search log data describes a search event of the user device triggered by a query directed toward a portal of the online advertising platform server 102 by the user via the user device, and the click log data describes a click event associated with the search event.

Figure 2:
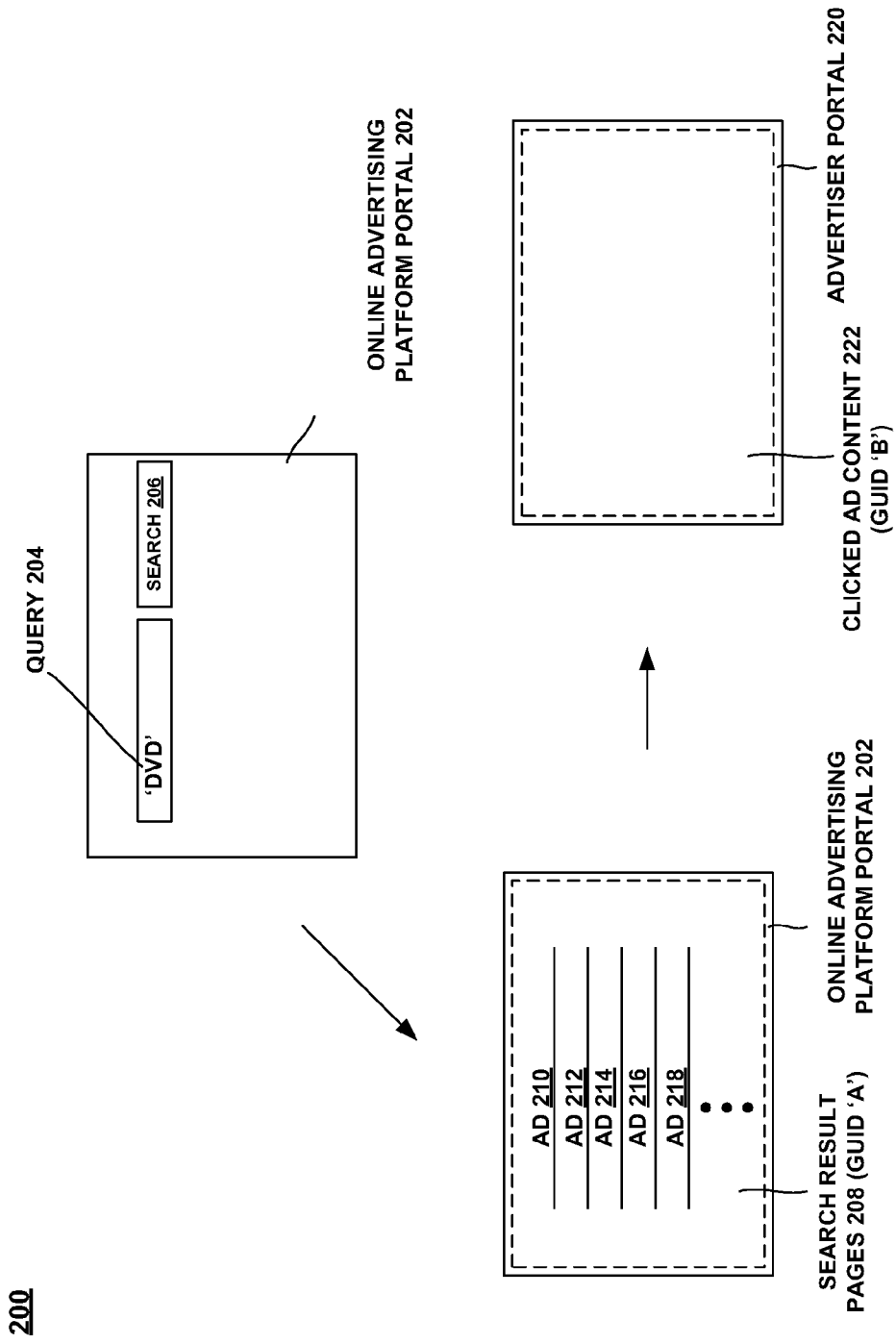
FIG. 2 is a process view illustrating a request for global user identifier (RGUID) which is used to link a search IP and a click IP, according to one embodiment.

FIG. 2 is a process view 200 illustrating a request for global user identifier (RGUID) which is used to link a search IP and a click IP, according to one embodiment. A query 204 is initiated by typing a search word (e.g., "DVD") on to a respective space on an online advertising platform portal 202. It is appreciated that the online advertising platform portal 202 may be a search engine provided by an advertising network, such as the online advertising platform 102 of FIG. 1. Once the query 204 is entered by a user and a search icon (e.g., button) 206 is pressed, the query 204 is identified by a request for globally unique identifier (RGUID) generated by the online advertising platform. It is appreciated that the GUID is a special type of identifier used in software applications in order to provide a reference number which is unique in any context. It is also appreciated that the RGUID is an identifier associated with the request for global user identifier assigned to search result pages 208.

The search result pages 208 are generated in response to the query 204 and displayed on the online advertising platform portal 202. The search result pages 208 are identified by a search result GUID (e.g., GUID 'A'). A search IP identifies an internet protocol address of a user device which forwards the query 204. When the user clicks an advertisement (ad) linkage (e.g., 210, 212, 214, 216, 218, etc.), an advertiser portal 220 displaying the content associated with the clicked user linkage (e.g., a clicked ad content 222) may be displayed. A click IP comprises an internet protocol address of the user device which performs a click of the advertisement linkage. The clicked ad content 222 is identified by a clicked ad GUID. The search IP and the click IP which share the RGUID are identified and used to build a user linkage representation, as will be illustrated in more details in FIGS. 5A and 5B.

FIG. 3 is a table view of an exemplary log data 302, according to one embodiment. One or more attributes of the log data 302 comprises a RGUID 304, a query 306, a search IP 308, a search time 310, a search GUID 312, a click IP 314, a click time 316 and a click GUID 318. The log data 302 can be saved at the server side of the advertising network (e.g., the online advertising platform 102 of FIG. 1), and may comprise search log data and click log data. The search log data may describe search events of a user or user device. The click log data may describe click events of a user or user device.

The RGUID 304 is a request for globally unique identifier (GUID) associated with the query 306. The RGUID 304 can be used to join the search log data and click log data since the query leads to the search and click events. The query 306 is a search word entered by a user via a user device. The search IP 308 is internet protocol address of the user device which is used to conduct the search. The search time 310 may indicate the time when the search result based on the query 306 is generated by the advertising network. The search GUID 312 may be a globally unique identifier assigned to the search result pages forwarded by the advertising network. The click IP 314 may be an internet protocol address of the user device which is used to click one of the advertisement linkages displayed on the search result pages. The click time 316 may indicate the time when one of the advertisement linkages is clicked by the user. The click GUID 318 may be a globally unique identifier assigned to the content associated with the particular advertisement linkage clicked by the user.

FIG. 4 is a block diagram illustrating IP switching behaviors between search IP addresses 402 and Click IP addresses 404, according to one embodiment. FIG. 4 illustrates the search IP addresses 402 interacting with the click IP addresses 404. In the figure, a search IP 406 is linked to a click IP 1 410 and a click IP 2 412, and a search IP 2 408 is linked to the click IP 2 412, a click IP 3 414, a click IP 4 416 and a click IP 5 418. Presence of a click fraud may be determined by analyzing a user linkage representation (e.g., FIG. 4) with respect to search times and click times of user devices associated with the search IP addresses 402 and the click IP addresses 404. The search times and click times may be available in the log data of the advertising network. The user linkage representation can be based on multiple user devices with each user device having a search IP and a click IP which share a RGUID. The user linkage representation may consider the search times and the click times of each user device. For example, the user linkage representation may be based on five minutes of window with respect to the search times and click times. In FIG. 4, during the time window, it is shown that search IP 1 406 and the click IP 2 412 as well as the search IP 2 408 and the click IP 2 412 have interacted twice while the rest of the search or click IP addresses have interacted only once.

FIG. 5A is an exemplary search IP by click IP matrix 500 for illustrating a user linkage representation, according to one embodiment. The matrix 500 is generated based on search IPs from search log data and click IPs from click log data. The search log data and click log data may be available as log data in an online advertising platform server, and one of the search IPs and one of the click IPs may be linked by a RGUID, where the RGUID is used to identify a query forwarded by a search IP. Once the matrix 500 is formed as in FIG. 5A, similar user clusters may be mined by applying a data mining technique such as co-clustering algorithm. It is appreciated that the co-clustering algorithm allows simultaneous clustering of the rows and columns of the matrix 500. Click fraud can be suspected if there are several similar user clusters demonstrating similar search and click behaviors. For example, the matrix 500 may be constructed based on a set time period (e.g., 10 minutes) based on search times and click times of user devices associated with the search and click IP addresses. Once the co-clustering algorithm is applied to the matrix 500 and similar user clusters sharing an identical search and click pattern, such as cluster 1 and cluster K, can be mined. Then, the user devices associated with the search IPs and click IPs present in the similar user clusters can be further investigated as potential candidates of click fraud.

Figure 5B:
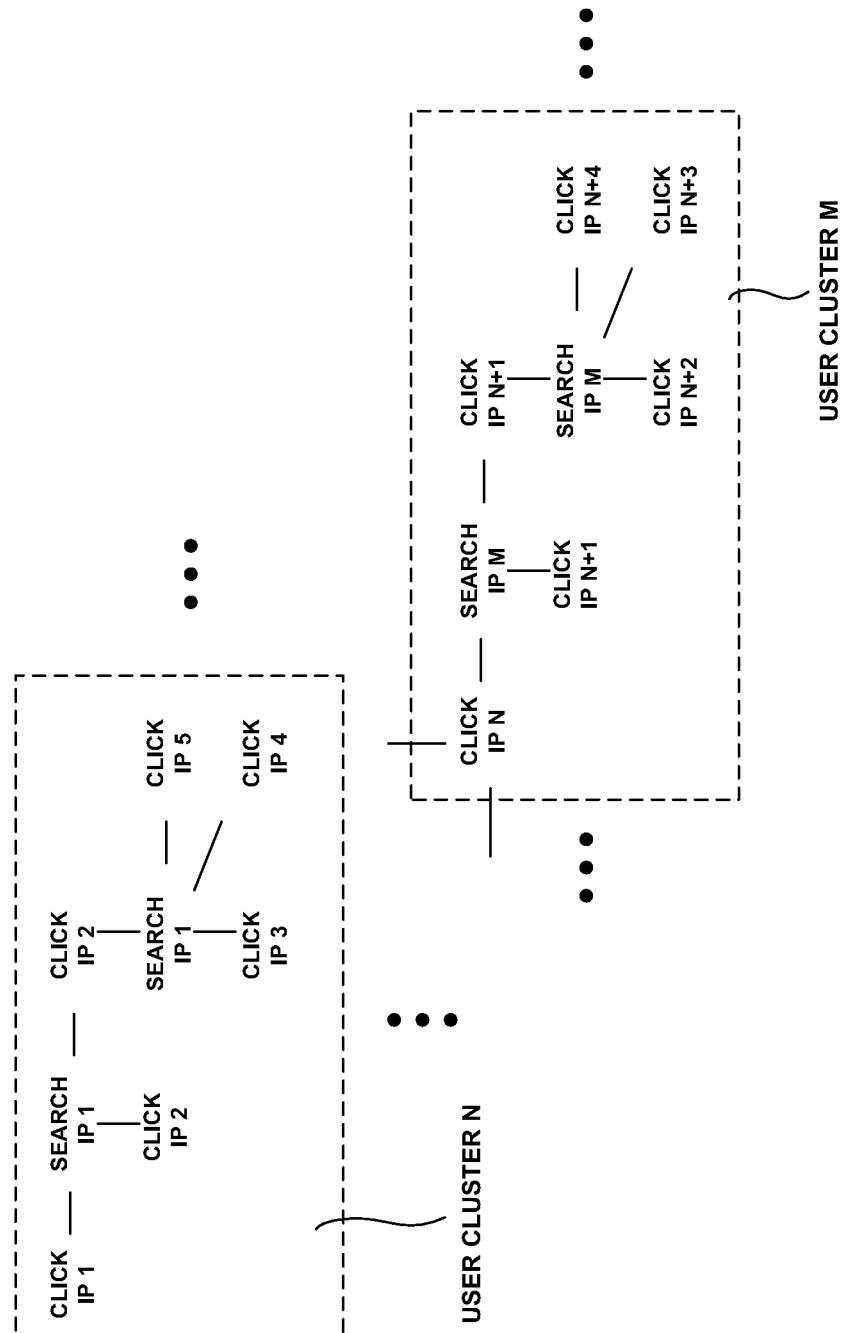
FIG. 5B is an exemplary user linkage graph for illustrating a user linkage representation, according to one embodiment.

FIG. 5B is an exemplary user linkage graph 550 for illustrating a user linkage representation, according to one embodiment. The user linkage graph 550 is generated based on search IPs from search log data and click IPs from click log data. The search log data and click log data may be available as log data in an online advertising platform server. Moreover, one of the search IPs and one of the click IPs may be linked by a RGUID, where the RGUID is used to identify a query forwarded by a search IP. Once the user linkage representation is formed as in FIG. 5B, similar user clusters may be mined by applying a graph search algorithm. It is appreciated that the graph search algorithm searches nodes in the user linkage graph 550 to mine similar user clusters. Click fraud can be suspected if there are several similar user clusters demonstrating similar search and click behaviors. For example, the graph 550 may be constructed based on a set time period (e.g., 10 minutes) based on search times and click times of user devices associated with the search and click IP addresses. Once the graph searching algorithm is applied to the graph 550 and similar user clusters sharing an identical search and click pattern, such as cluster N and cluster M, can be mined. Then, the user devices associated with the search IPs and click IPs present in the similar user clusters can be further investigated as potential candidates of click fraud.

Figure 6:
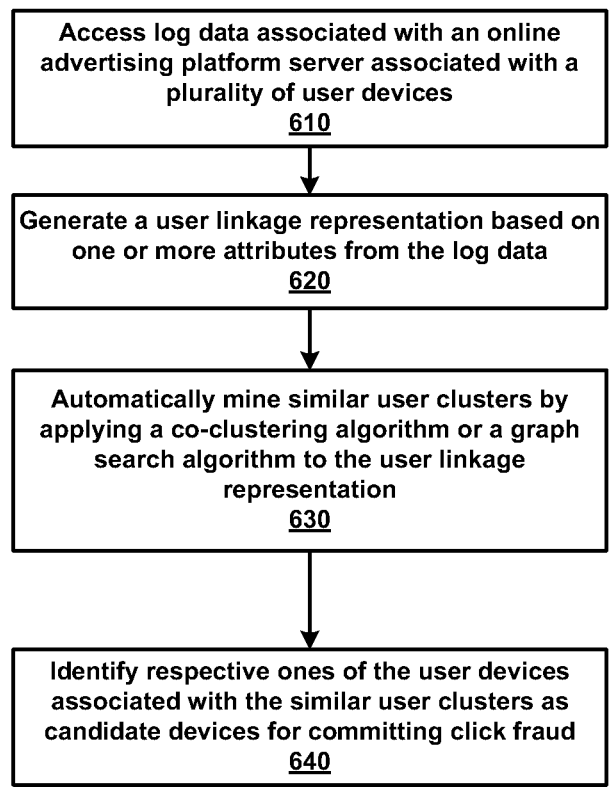
FIG. 6 is a process flow chart for an exemplary method of mining similar user clusters for click fraud detection, according to one embodiment.

FIG. 6 is a process flow chart for an exemplary method 600 of mining similar user clusters for click fraud detection, according to one embodiment. In operation 610, log data (e.g., search log data and click log data) associated with an online advertising platform server is accessed. The search log data describes a search event by the user triggered by a query directed toward a portal of an online advertising platform server, and the click log data describes a click event associated with the search event. The query is identified by a request for a globally unique identifier (RGUID).

In operation 620, a user linkage representation is generated based on one or more attributes from the log data. The attributes comprise the RGUID, the query, a search IP, a search time, a search GUID, a click IP, a click time, or a click GUID. Search result pages are generated in response to the query, and the search result pages are identified by the search result GUID. The search IP comprises an internet protocol address of a user device which forwards the query. The click IP comprises an internet protocol address of the user device which clicks an advertisement linkage displayed on the search result pages. Content associated with the advertisement linkage is identified by the clicked advertisement GUID. The user linkage representation is based on multiple user devices with each user device having the search IP and the click IP which share the RGUID. The user linkage representation considers the search time and the click time of each user device.

In operation 630, similar user clusters are automatically mined by applying a co-clustering algorithm or a graph search algorithm to the user linkage representation. In operation 640, those ones of the user devices associated with the similar user clusters are identified as candidate devices for committing click fraud. For example, if there are two or more similar user clusters mined with respect to the search time and the click time of each user device (e.g., within 10 minute interval of the search time and/or the click time), the user devices included in the similar user clusters can be classified as strong suspect devices for committing click fraud.

Figure 7:
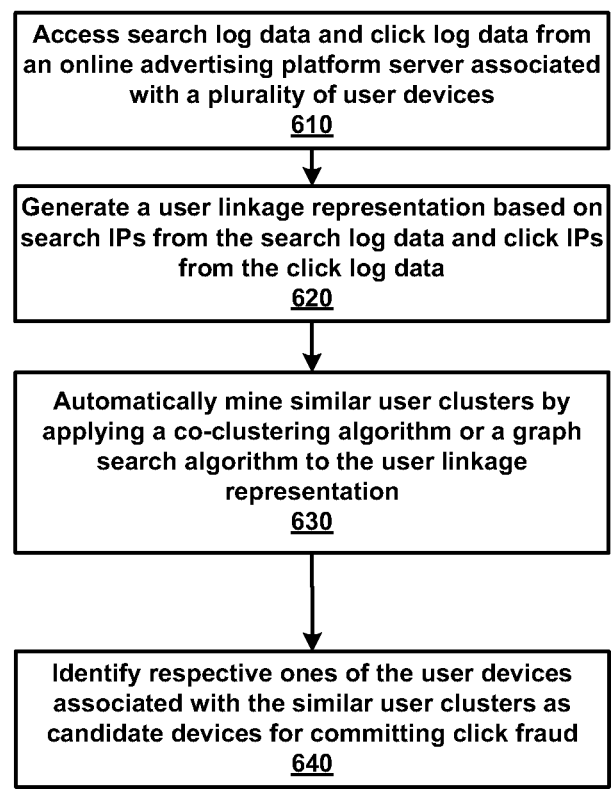
FIG. 7 is a process flow chart for another exemplary method of mining similar user clusters for click fraud detection, according to one embodiment.

FIG. 7 is a process flow chart for another exemplary method of mining similar user clusters for click fraud detection, according to one embodiment. In operation 710, search log data and click log data are accessed from an online advertising platform server. The online advertising platform server may be associated with a set of user devices. The search log data describes a search event of each user device, which is triggered by a query directed toward a portal of an online advertising platform server. The click log data describes a click event associated with the search event. The query is identified by a request for a globally unique identifier (RGUID).

In operation 720, a user linkage representation is generated based on search IPs from the search log data and click IPs from the click log data. Each one of the search IPs may be linked with a respective one of the click IPs using the RGUID. The search IPs comprise an internet protocol address of a user device which forwards the query. The click IPs comprises an internet protocol address of a user device which clicks an advertisement linkage displayed on the search result pages in response to the query. The user linkage representation is based on multiple user devices with each user device having one or more of the search IPs and one or more of the click IPs.

In operation 730, similar user clusters are automatically mined by applying a co-clustering algorithm or a graph search algorithm to the user linkage representation. In operation 740, those ones of the user devices associated with the similar user clusters are identified as candidate devices for committing click fraud. For example, if there are two or more similar user clusters mined with respect to the search time and the click time of each user device (e.g., within 10 minute interval of the search time and/or the click time), the user devices included in the similar user clusters can be classified as strong suspect devices for committing click fraud.

Thus, embodiments provide technology for mining similar user clusters based on user click behaviors. The technology is ideal for an online advertising platform in dealing with click frauds being committed on the web. This is because the online advertising platform has a ready access to log data associated with advertisements it is carrying. The technology which allows the online advertising platform to mine and analyze the similar user clusters makes it possible to locate and determine suspicious activities associated with pay per click in a more efficient manner.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method performed on a computing device, the method for determining click fraud, the method comprising:
    accessing log data that represents search events and corresponding click events, where the log data is based on a plurality of user devices performing the search events and the corresponding click events, where each of the search events occurs when a corresponding one of the plurality of user devices performs a query via a search internet protocol ("IP") address, and where each of the corresponding click events occurs when the corresponding one of the plurality of user devices selects, via a click IP address, an advertisement included in a search result provided in response to the performed query, where, for each of the search events, the log data comprises a corresponding search time that indicates a time that the corresponding search result was generated, the corresponding query, and a request globally unique identifier ("RGUID") that uniquely identifies the corresponding performed query and that is assigned to the corresponding search result provided in response to the corresponding performed query, and where, for each of the click events, the log data further comprises a corresponding click time that indicates a time that the corresponding advertisement was selected;
    constructing a user linkage representation of the accessed log data based on a set time period that is based on a portion of the search times and the click times, where the set time period covers the portion of the search times and the click times, and where, for each of the search events and the corresponding click events within the set time period, the search IP address is linked to the click IP address in the user linkage representation;
    mining similar user clusters from the user linkage representation, where the mined similar user clusters share search and click patterns identified in the user linkage representation; and
    identifying, based on the shared search and click patterns, ones of the plurality of user devices associated with the similar user clusters as candidate devices for committing click fraud.

2. The method as recited in claim 1, wherein the log data comprises search log data and click log data.

3. The method as recited in claim 2, wherein the search log data represents a search event triggered by the query, and where the click log data describes a click event associated with the search event.

4. The method as recited in claim 3, wherein the results of the query are identified by a search globally unique identifier.

5. The method as recited in claim 1 further comprising, analyzing the user linkage representation with respect to the search time and the click time.

6. The method as recited in claim 5, wherein the identifying the respective ones of the user devices further comprises classifying the respective ones of the user devices as strong suspect devices for committing click fraud based on at least two of the similar user clusters.

7. At least one computer memory device storing instructions that, when executed by a computing device, cause the computing device to perform actions for determining click fraud, the actions comprising:
    accessing log data that represents search events and corresponding click events, where the log data is based on a plurality of user devices performing the search events and the corresponding click events, where each of the search events occurs when a corresponding one of the plurality of user devices performs a query via a search internet protocol ("IP") address, and where each of the corresponding click events occurs when the corresponding one of the plurality of user devices selects, via a click IP address, an advertisement included in a search result provided in response to the performed query, where, for each of the search events, the log data comprises a corresponding search time that indicates a time that the corresponding search result was generated, the corresponding query, and a request globally unique identifier ("RGUID") that uniquely identifies the corresponding performed query and that is assigned to the corresponding search result provided in response to the corresponding performed query, and where, for each of the click events, the log data further comprises a corresponding click time that indicates a time that the corresponding advertisement was selected;

constructing a user linkage representation of the accessed log data based on a set time period that is based on a portion of the search times and the click times, where the set time period covers the portion of the search times and the click times, and where, for each of the search events and the corresponding click events within the set time period, the search IP address is linked to the click IP address in the user linkage representation;

mining similar user clusters from the user linkage representation, where the mined similar user clusters share search and click patterns identified in the user linkage representation; and identifying, based on the shared search and click patterns, ones of the plurality of user devices associated with the similar user clusters as candidate devices for committing click fraud.

8. The at least one computer memory device as recited in claim 7, where the log data comprises search log data and click log data.

9. The at least one computer memory device as recited in claim 8, where the search log data represents a search event triggered by the query, and where the click log data describes a click event associated with the search event.

10. The at least one computer memory device as recited in claim 9, where the results of the query are identified by a search globally unique identifier.

11. A system comprising a computer and software together configured for performing actions for determining click fraud, the actions comprising:

accessing log data that represents search events and corresponding click events, where the log data is based on a plurality of user devices performing the search events and the corresponding click events, where each of the search events occurs when a corresponding one of the plurality of user devices performs a query via a search internet protocol ("IP") address, and where each of the corresponding click events occurs when the corresponding one of the plurality of user devices selects, via a click IP address, an advertisement included in a search result provided in response to the performed query, where, for each of the search events, the log data comprises a corresponding search time that indicates a time that the corresponding search result was generated, the corresponding query, and a request globally unique identifier ("RGUID") that uniquely identifies the corresponding performed query and that is assigned to the corresponding search result provided in response to the corresponding performed query, and where, for each of the click events, the log data further comprises a corresponding click time that indicates a time that the corresponding advertisement was selected;

constructing, by the computer, a user linkage representation of the accessed log data based on a set time period that is based on a portion of the search times and the click times, where the set time period covers the portion of the search times and the click times, and where, for each of the search events and the corresponding click events within the set time period, the search IP address is linked to the click IP address in the user linkage representation;

mining similar user clusters from the user linkage representation, where the mined similar user clusters share search and click patterns identified in; and identifying, based on the shared search and click patterns, ones of the plurality of user devices associated with the similar user clusters as candidate devices for committing click fraud.

12. The system of claim 11 where the log data comprises search log data and click log data.

13. The system of claim 12 where the search log data represents a search event device triggered by the query, and where the click log data describes a click event associated with the search event.

14. The system of claim 13 where the results of the query are identified by a search globally unique identifier.

15. The system of claim 11, the actions further comprising analyzing the user linkage representation with respect to the search time and the click time.

\* \* \* \* \*